(12) United States Patent
Hwang et al.

(10) Patent No.: US 10,144,151 B2
(45) Date of Patent: Dec. 4, 2018

(54) FRAME INTEGRATED VACUUM HOT PRESS APPARATUS

(71) Applicant: ENERGYN INC., Incheon (KR)

(72) Inventors: Ihn Kee Hwang, Incheon (KR); Jin Suk Jang, Incheon (KR)

(73) Assignee: ENERGYN INC., Incheon (KR)

( * ) Notice: Subject to any disclaimer, the term of this patent is extended or adjusted under 35 U.S.C. 154(b) by 117 days.

(21) Appl. No.: 15/302,494

(22) PCT Filed: Mar. 17, 2015

(86) PCT No.: PCT/KR2015/002572
§ 371 (c)(1),
(2) Date: Oct. 7, 2016

(87) PCT Pub. No.: WO2015/156511
PCT Pub. Date: Oct. 15, 2015

(65) Prior Publication Data
US 2017/0217046 A1    Aug. 3, 2017

(30) Foreign Application Priority Data

Apr. 11, 2014    (KR) .................. 10-2014-0043426

(51) Int. Cl.
*B28B 3/08*    (2006.01)
*B28B 3/02*    (2006.01)
(Continued)

(52) U.S. Cl.
CPC ................ *B28B 3/025* (2013.01); *B22F 3/14* (2013.01); *B28B 3/086* (2013.01); *B28B 7/0097* (2013.01);
(Continued)

(58) Field of Classification Search
CPC ........... B28B 3/00; B28B 3/025; B28B 3/086; C04B 35/645; B22F 3/14; B29C 43/52;
(Continued)

(56) References Cited

U.S. PATENT DOCUMENTS 3,971,875 A * 7/1976 Regalbuto ................. B22F 3/14
219/243
3,988,088 A * 10/1976 King ........................ B22F 3/03
425/126.1
(Continued)

FOREIGN PATENT DOCUMENTS

JP          61-199002      *   9/1986
JP          2004-001008 A      1/2004
(Continued)

OTHER PUBLICATIONS

International Search Report for PCT/KR2015/002572 dated May 20, 2015 from Korean Intellectual Property Office.

*Primary Examiner* — James P Mackey
(74) *Attorney, Agent, or Firm* — Revolution IP, PLLC (57) ABSTRACT

A frame integrated vacuum hot press comprises a frame chamber including a vacuum space having an opened side; a door installed to the frame chamber to open or close the opened side of the vacuum space; a heating chamber including a heating space and a heater heating an object to be formed which is loaded in the heating space; and a cylinder which is connected to the frame chamber to apply pressure to the object to be formed which is loaded in the heating space of the heating chamber.

10 Claims, 8 Drawing Sheets

(51) Int. Cl.
*C04B 35/645* (2006.01)
*B28B 7/00* (2006.01)
*B22F 3/14* (2006.01)
*B30B 11/02* (2006.01)
*B29C 43/52* (2006.01)
*B29C 43/56* (2006.01)

(52) U.S. Cl.
CPC ............ *B30B 11/02* (2013.01); *C04B 35/645* (2013.01); *B22F 2999/00* (2013.01); *B29C 43/52* (2013.01); *B29C 2043/563* (2013.01); *C04B 2235/668* (2013.01)

(58) Field of Classification Search
CPC .............. B29C 43/56; B29C 2043/561; B29C 2043/563
See application file for complete search history.

(56) References Cited

U.S. PATENT DOCUMENTS

| | | | | |
|---|---|---|---|---|
| 4,521,172 A | * | 6/1985 | Gilbert | ................. B29C 43/56 425/420 |
| 5,989,487 A | * | 11/1999 | Yoo | ................. B22F 3/093 266/249 |
| 7,195,476 B2 | * | 3/2007 | Ito | ................. B29C 43/36 100/90 |
| 2005/0089597 A1 | | 4/2005 | Ito | |

FOREIGN PATENT DOCUMENTS

| | | |
|---|---|---|
| KR | 10-2002-0096490 A | 12/2002 |
| KR | 10-2007-0118866 A | 12/2007 |
| KR | 10-1358149 B1 | 2/2014 |

* cited by examiner

FRAME INTEGRATED VACUUM HOT PRESS APPARATUS

CROSS REFERENCE TO PRIOR APPLICATIONS

This application is a National Stage Application of PCT International Patent Application No. PCT/KR2015/002572 filed on Mar. 17, 2015, under 35 U.S.C. § 371, which claims priority to Korean Patent Application No. 10-2014-0043426 filed on Apr. 11, 2014, which are all hereby incorporated by reference in their entirety.

TECHNICAL FIELD

The present invention relates to a frame integrated vacuum hot press capable of applying heat and pressure to an object to be formed, such as a powder or a preform, under a vacuum atmosphere to sinter the object to be formed.

BACKGROUND ART

In general, a non-oxide structural material, such as SiC, BC or SiN, is a main element of ceramics having high strength, high hardness, high abrasion resistance, high oxidation resistance, and high corrosion resistance.

Since the non-oxide structural material shares a strong covalent bond due to its chemical property, it is very difficult to mold the non-oxide structural material through a sintering process. Therefore, the non-oxide structural material is generally formed by a hot press sintering method.

The hot press sintering method can make a sintered body of dense structure by simultaneously applying high heat and pressure to the preform. Such a device capable of carrying out the hot press sintering method is disclosed in Korean Patent Laid-Open No. 10-2007-0118866 (published on Dec. 18, 2007).

Figure 1:
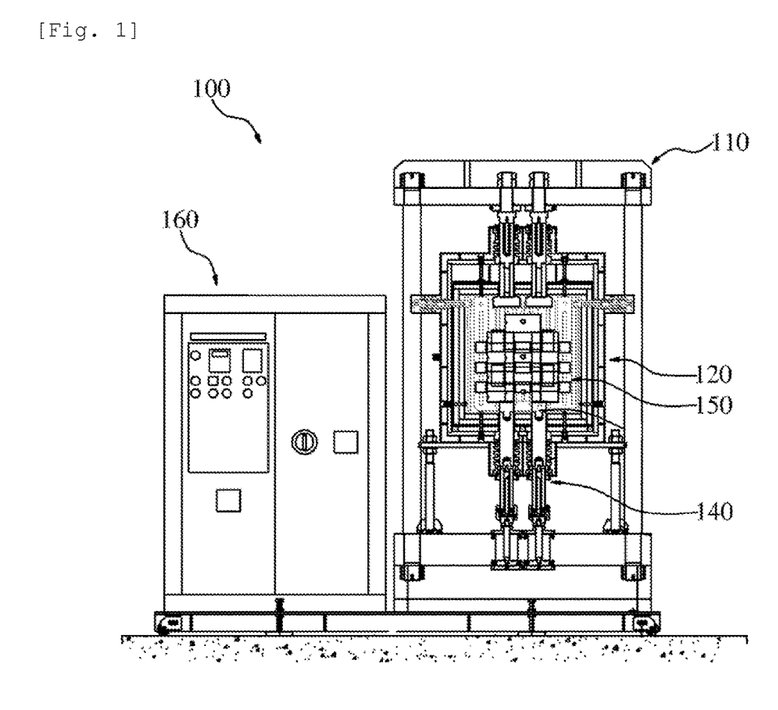
FIG. 1 is a front view illustrating a hot press sintering device of the related art.
Figure 2:
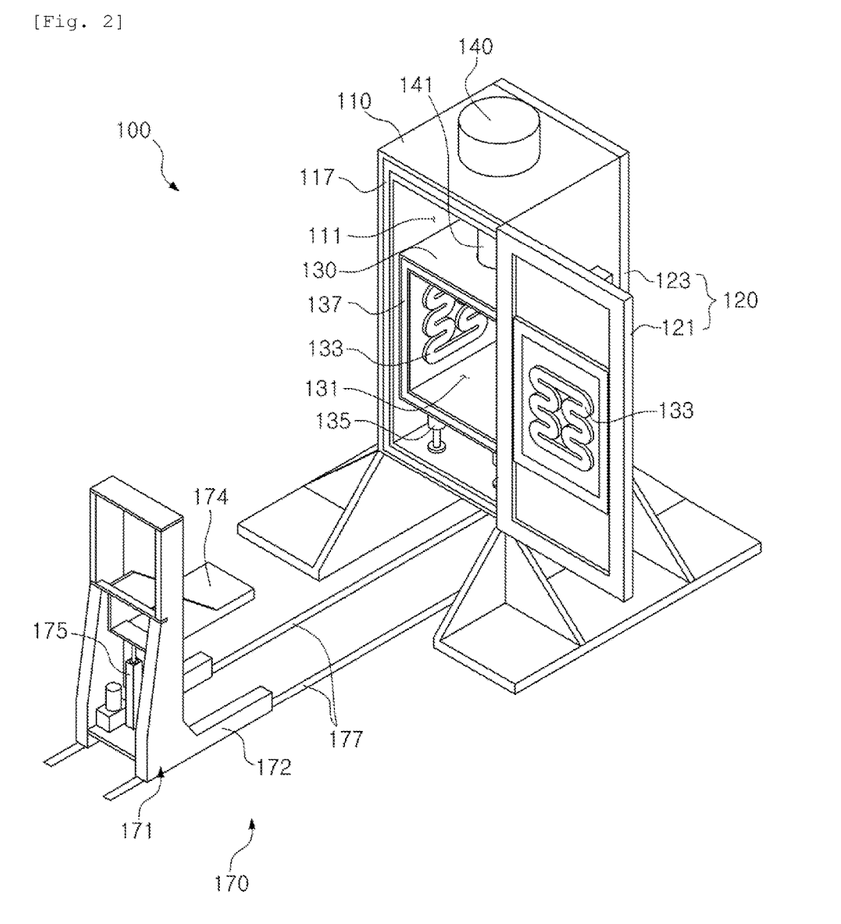
FIG. 2 is a perspective view illustrating a frame integrated vacuum hot press according to an embodiment of the present invention.
Figure 3:
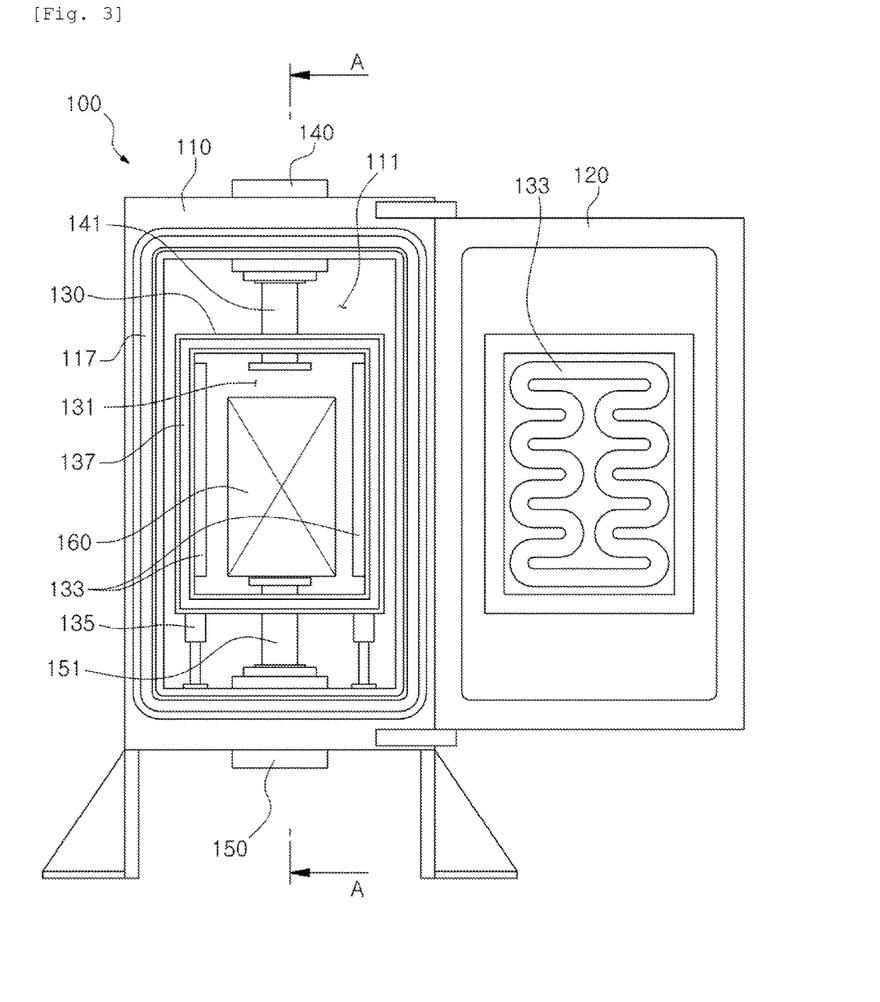
FIG. 3 is a front view illustrating the frame integrated vacuum hot press according to the embodiment of the present invention, in which a door is opened.

As illustrated in FIG. 1, a hot press sintering device 100 (referred to as a hot press) of the related art includes a base frame 110 for supplying the entire load of the device and easily transporting the device, a control unit 160 for controlling the whole operation of the device and displaying a current operating state of the device, a heating unit 120 having a space into which a sintering mold 150 for forming an object to be sintered is mounted, and supplying heat required for a sintering process to the object to be sintered under the control, the sintering mold 150 which is disposed in the heating unit and has a multiple-layers and -axes molding structure having a loading and molding space for the object to be sintered, and a pressing unit 140 of a multiple-axes structure for applying pressure to the sintering mold 150 to mold the object to be sintered with sufficient strength.

The above-described hot press sintering device 100 carries out the sintering process on the object to be formed by loading the object to be formed in the sintering mold 150 and heating the object to be formed using the heating unit 120, with the object being pressed by the pressing unit 140.

However, the hot press sintering device 100 of the related art has some problems in that since the base frame 110 is required to support the pressing unit 140, its structure is complicated, and thus a production cost is increased, and since the heat is easily released outwardly from the sintering mold 150, a lot of time is taken to heat the object to be formed, and a lot of heat loss happens.

DISCLOSURE

Technical Problem

Accordingly, the present invention has been made in view of the above-mentioned problems, and an object of the present invention is to provide a frame integrated vacuum hot press having a simple structure that can lower a production cost, and can quickly apply heat to an object to be formed, in addition to an increased insulation effect and a minimized heat loss.

Technical Solution

To accomplish the above-mentioned object, according to one aspect of the present invention, there is provided a frame integrated vacuum hot press including: a frame chamber including a vacuum space having an opened side; a door installed to the frame chamber to open or close the opened side of the vacuum space; a heating chamber including a heating space and a heater heating an object to be formed which is loaded in the heating space; and a cylinder which is connected to the frame chamber to apply pressure to the object to be formed which is loaded in the heating space of the heating chamber.

The frame integrated vacuum hot press may further include a mold which is seated in the heating chamber and is pressed by the cylinder to compress the object to be formed, thereby enabling the object to be formed to have a desired shape.

The heating chamber may be configured so that a side facing the same direction as the opened side of the frame chamber is opened, and the heating space may be opened or closed by the door when the vacuum space is opened or closed by the door.

The frame integrated vacuum hot press may further include a first sealing configured to hermetically seal a gap between a circumference of the vacuum space and the door; and a second sealing configured to hermetically seal a gap between a circumference of the heating space and the door.

The cylinder may include a first cylinder and a second cylinder to apply pressure to both sides of the frame chamber in an opposite direction.

The door may include a first door to open or close one side of the vacuum space, and a second door to open or close the other side of the vacuum space opposite to the one side.

The heating chamber may include a height adjusting unit to adjust a height of the heating chamber in the frame chamber.

The frame integrated vacuum hot press may further include a transport mechanism configured to carry the mold in or out from the heating chamber.

The transport mechanism may include a rail installed on a floor of the main frame, and a cart running along the rail to carry the mold.

The frame chamber may include a vacuum unit to evacuate the vacuum space to adjust a degree of vacuum in the vacuum space.

Advantageous Effects

According to the present invention, contrary to the related art requiring a separate frame to fix a chamber and a cylinder, since the cylinder is fixedly installed to the frame chamber, the structure is simple, and thus a production cost is lowered.

Also, since the heating chamber is installed in the frame chamber so that the heat of the heating chamber is insulated by the vacuum chamber formed in the frame chamber, an insulation effect is improved, and it is possible to minimize a heat loss, as well as quickly heating the object to be formed.

In addition, since the frame chamber and the heating chamber are simultaneously opened or closed by the door, it is possible to easily and quickly load or unload the object to be formed.

BRIEF DESCRIPTION OF REFERENCE NUMERALS

100: Frame Integrated Vacuum Hot Press
110: Frame Chamber
111: Vacuum Space
117: First Sealing
120: Door
121: First Door
123: Second Door
130: Heating Chamber
131: Heating Space
133: Heater
135: Height Adjusting Part
137: Second Sealing
140: First Cylinder
141, 151: Driving Shaft
150: Second Cylinder
160: Mold
170: Transport Mechanism
171: Cart
172: Traveling Unit
173: Wheel
174: Shelf
175: Movable Cylinder
177: Rail

MODE FOR INVENTION

Hereinafter, an embodiment of the present invention will now be described in detail with reference to the accompanying drawings.

As illustrated in FIGS. 2 to 5, a frame integrated vacuum hot press 100 according to an embodiment of the present invention may include a frame chamber 110.

The frame chamber 110 is formed in the shape of a box so that a vacuum space 111 is formed to create vacuum therein.

The frame chamber 110 may be configured such a way that one side or both opposite sides thereof are opened to open the vacuum space 111. The frame chamber 110 may be equipped with cylinders 140 and 150 which will be described in detail hereinafter.

The frame integrated vacuum hot press 100 according to the embodiment of the present invention may include a door 120.

The door 120 is pivotally installed to the frame chamber 110 to open or close the vacuum space 11 which is opened from the frame chamber.

The door 120 may have a first door 121 and a second door 123.

For example, the door 120 opens two opposite opened sides of the frame chamber 110, in which the first door 121 is installed to one of the opposite opened sides, while the second door 123 is installed to the other, as shown in this embodiment, so that the vacuum space 111 is opened or closed by the first door 121 and the second door 123.

In the case where the door 120 consists of the first door 121 and the second door 123, an object to be formed can be loaded in or unloaded from both sides of the frame chamber 110, and the inside of the hot frame chamber 110 can be quickly cooled.

The frame integrated vacuum hot press 100 according to the embodiment of the present invention may include cylinders 140 and 150.

These cylinders can apply pressure to the workpiece positioned in the vacuum space 111 of the frame chamber 110 to carry out compressing molding.

As shown in this embodiment, the cylinders 140 and 150 may consist of a first cylinder 140 and a second cylinder 150.

The first cylinder 140 and the second cylinder 150 apply the pressure to the workpiece positioned in the vacuum chamber 111 of the frame chamber 110 in an opposite direction to carry out the compression molding.

The operation of the first cylinder 140 and the second cylinder 150 is known in the art, and thus the detailed description will be omitted herein.

Meanwhile, the first cylinder 140 and the second cylinder 150 may be operated by hydraulic pressure or pneumatic pressure.

Figure 4:
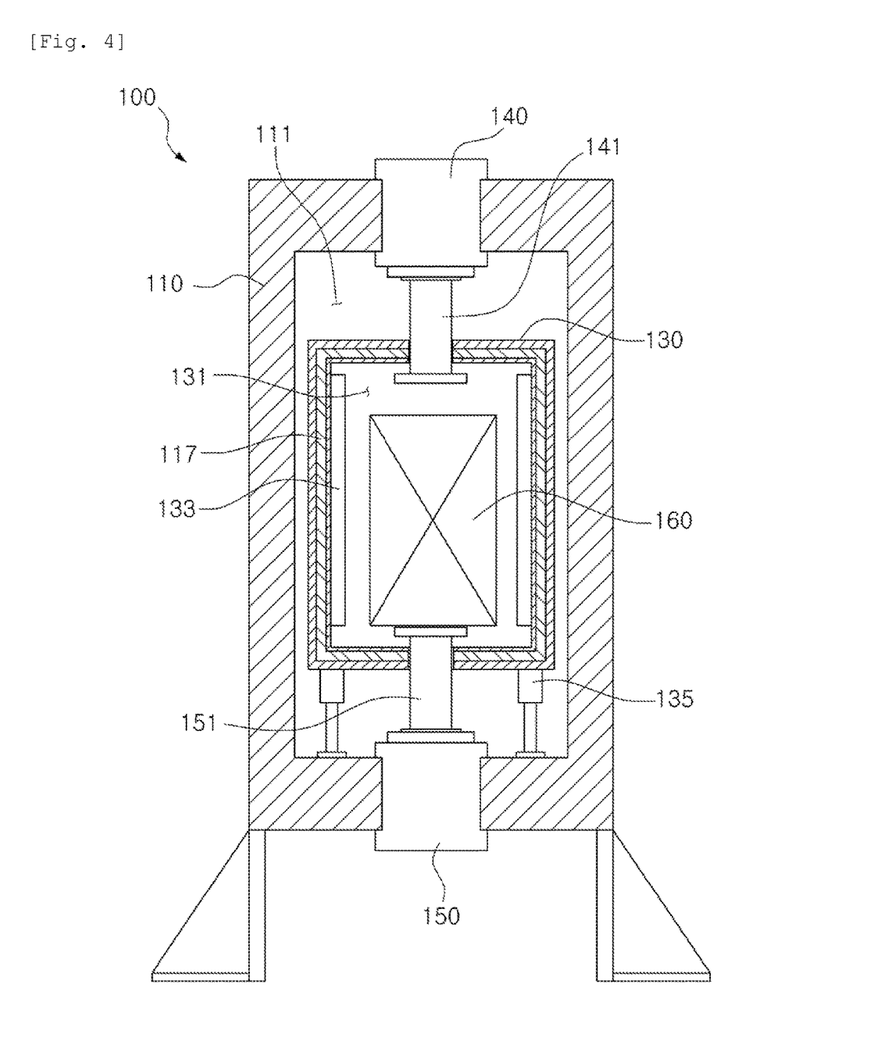
FIG. 4 is a cross-sectional view illustrating the frame integrated vacuum hot press according to the embodiment of the present invention.
Figure 5:
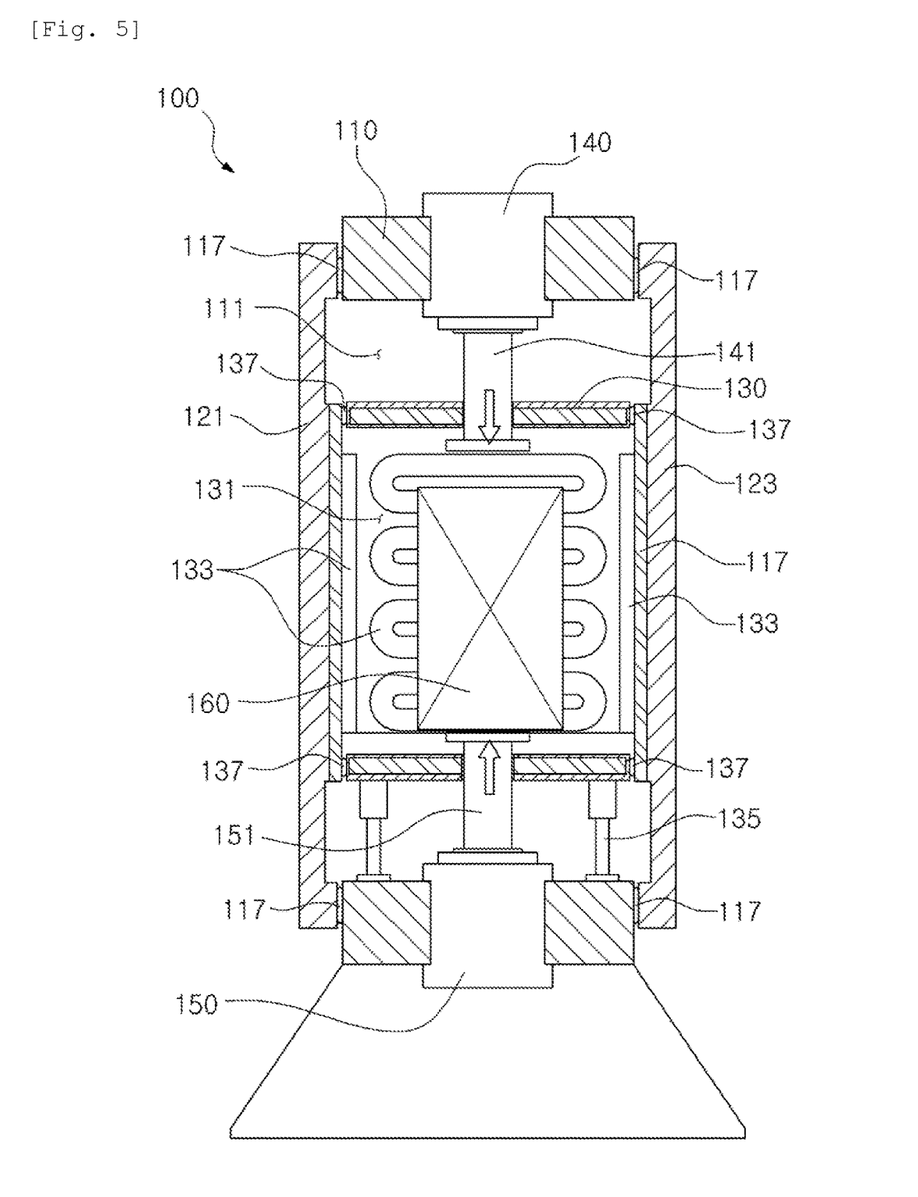
FIG. 5 is a cross-sectional view taken along the line A-A in FIG. 4.

The first cylinder 140 and the second cylinder 150 may be fixed to the frame chamber 110, and each driving shafts 141 and 151 may be extended or retracted into or from the vacuum shape 111 through the frame chamber 110.

In this instance, the first cylinder 140 and the second cylinder 150 may be respectively installed to both opposite sides of the frame chamber 110 so that the driving shafts 141 and 151 are positioned in an opposite direction, with the vacuum space 111 being interposed between the driving shafts, to apply the pressure to the workpiece positioned between the driving shafts. In this embodiment, the first cylinder 140 and the second cylinder 150 are installed to upper and lower portions of the frame chamber 110 in the opposite direction.

The driving shaft 141 of the first cylinder 140 and the driving shaft 151 of the second cylinder 150 may serve as a heater to apply heat to the object to be formed at compression, or may be equipped with a heater which is heated by electricity.

Figure 6:
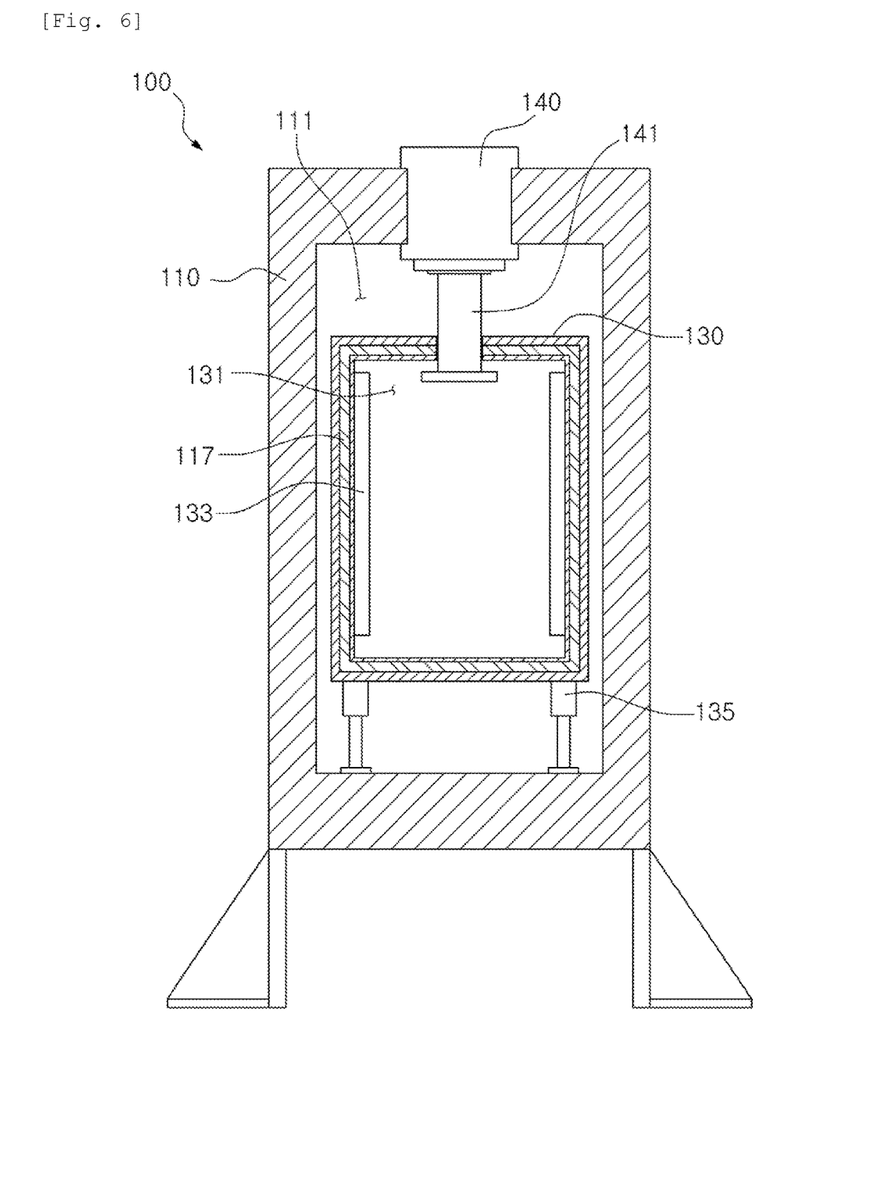
FIG. 6 is a cross-sectional view illustrating a state in which a cylinder of the frame integrated vacuum hot press according to the embodiment of the present invention is connected to an upper portion of a frame chamber.
Figure 7:
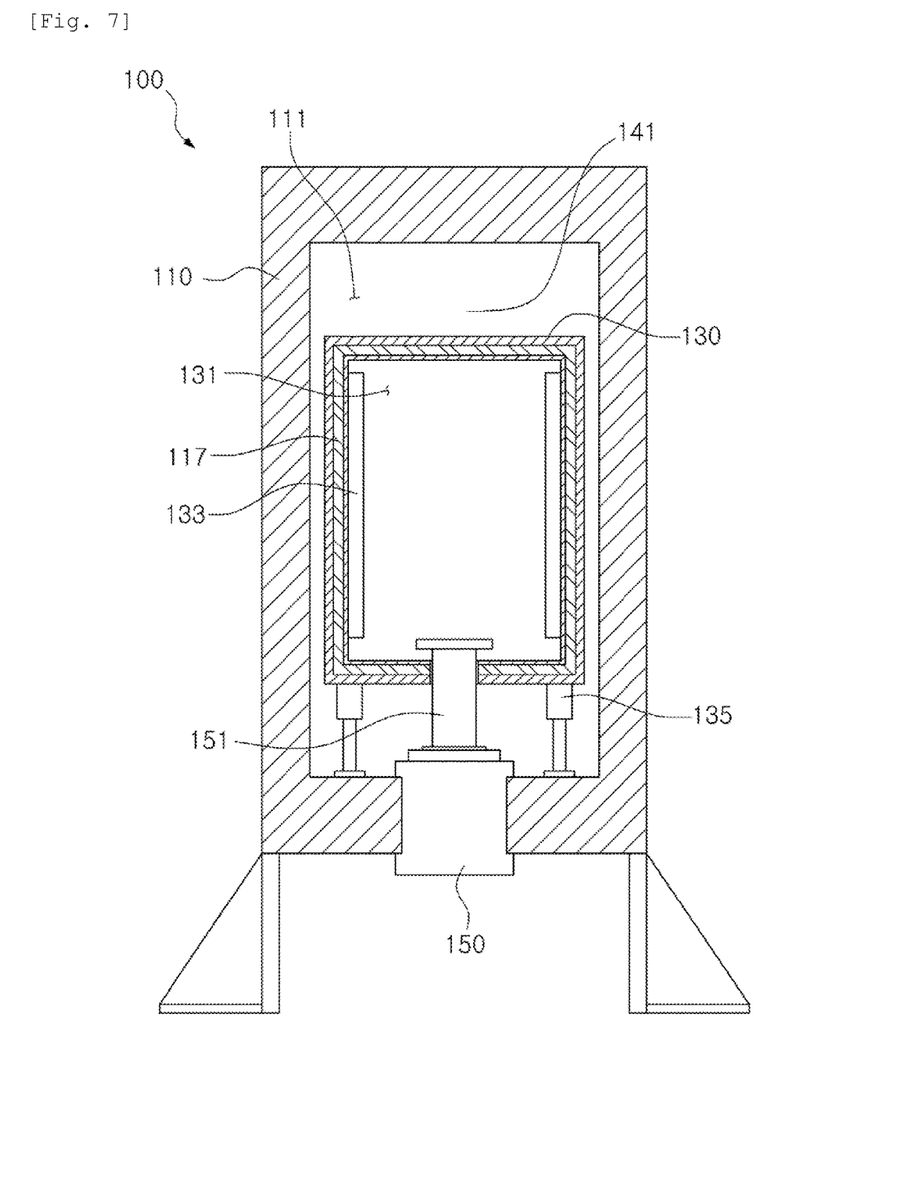
FIG. 7 is a cross-sectional view illustrating a state in which the cylinder of the frame integrated vacuum hot press according to the embodiment of the present invention is connected to a lower portion of the frame chamber.

As illustrated in FIG. 6, the cylinders 140 and 150 may consist of only the first cylinder 140, which is engaged to the upper portion of the frame chamber 110, to apply the pressure to the object to be formed from the upper portion of the frame chamber 110. As illustrated in FIG. 7, the cylinders 140 and 150 may consist of only the second cylinder 150, which is engaged to the lower portion of the frame chamber 110, to apply the pressure to the object to be formed from the lower portion of the frame chamber 110.

The frame integrated vacuum hot press 100 according to the embodiment of the present invention may include a mold 160.

The mold 160 is, for example, a metallic die of a shape corresponding to a wanted shape of the workpiece. For example, the mold 160 may be divided into plural parts, such as an upper mold and a lower mold, and be pressed by external pressure, thereby compressing the workpiece to have the wanted shape.

In this instance, the mold 160 is pressed by the driving shafts 141 and 151 of the cylinders 140 and 150 to apply the pressure to the workpiece inserted in plural dies.

The workpiece may be a powder, or may be a preform of a desired shape, for example, a plate, a layered plate, or a block. The workpiece can be loaded in or unloaded from the heating chamber 130 in the state in which the workpiece is inserted in the mold 160.

The frame integrated vacuum hot press 100 according to the embodiment of the present invention may include a heating chamber 130.

The heating chamber 130 is formed in the shape of a box with a heating space 131, and is positioned in the frame chamber 110. The heating chamber 130 may be equipped with a heater 133 so that the workpiece loaded in the heating chamber is compressed by the cylinders 140 and 150 in the state in which the object to be formed is heated.

The object to be formed can be loaded in the heating space 131 by inserting the object to be formed in the mold 160 and then carrying the mold 160 in the heating space 131.

Also, the heating chamber 130 may be formed to have a size suitable for being carried in the heating chamber 130, and the heater 133 may be installed on an inner peripheral surface of the heating chamber 130 to apply the heat to the object to be heated inserted in the mold 160.

The heating chamber 130 is formed in such a way that the same side as the opened side of the frame chamber is opened, so that the heating space 131 which is the inner space can be opened or closed by the door 120 installed to the frame chamber 110.

The mold 160 inserted in the heating space 131 of the heating chamber 130 is pressed by the driving shaft 141 of the first cylinder 140 and the driving shaft 151 of the second cylinder 150. In this instance, the driving shaft 141 of the first cylinder 140 and the driving shaft 151 of the second cylinder 150 can penetrate through the heating chamber 130 to apply the pressure to the mold.

The heater 133 installed to the heating chamber 130 may be heated by the electricity, and a plurality of heaters 133 may be installed on the inner peripheral surface of the heating chamber 130. Alternatively, the heater may be installed to a portion of the door 120 opening or closing the frame chamber 110, that is, a portion of the door 120 closing the heating chamber 130, or may be installed to the inside of the upper and lower portions of the heating chamber 130.

The heater 133 may include a hot wire which is heated by the electricity. As illustrated in this embodiment, the heater may be formed of a plate with a zigzag array of graphite, and if the electricity is applied to the plate, the heater generates the heat.

If the heater 133 is made of the graphite, the heating chamber 130 can be heated at a high temperature. The reason is that since the graphite is a crystalline form of carbon, the graphite generates the heat at a temperature higher than the hot wire made of a metal.

The heating chamber 130 may further have a height adjusting part 135. The height adjusting part 135 can adjust a height of the heating chamber 130 positioned in the frame chamber 110.

The height adjusting part 135 may have a driving cylinder (not illustrated) so that the heating chamber 130 connected to the driving cylinder is moved upward or downward in the frame chamber 110. Any one of the heating chamber 130 and the height adjusting part 135 is formed with a threaded portion on an outer surface thereof, while the other is provided with an engaging portion which is threadedly engaged to a threaded rod. As the threaded rod rotates, the heating chamber 130 moves upward or downward.

Since the height of the heating chamber 130 is adjusted in the frame chamber 110, the height of the mold to be inserted in the heating chamber 130 can be adjusted, as well as adjusting the height to heat the mold 160.

The frame integrated vacuum hot press 100 according to the embodiment of the present invention may include a first sealing 117 and a second sealing 137.

The first sealing 117 hermetically seals a gap between the frame chamber 110 and the door 120 to seal the vacuum space 111 of the frame chamber 110.

The first sealing 117 may be provided to at least one of a circumferential portion of the frame chamber 110 formed along the opened side of the vacuum space 111 and the portion of the door 120 corresponding to the circumferential portion. The first sealing portion 117 may be made of rubber, synthetic resin, urethane, silicon or other materials having high airtightness.

The second sealing 137 hermetically seals a gap between the heating chamber 130 and the door 120 to seal the heating space 131 of the heating chamber 130.

The second sealing 137 may be provided to at least one of a circumferential portion of the heating chamber 130 formed along the opened side of the heating space 131 and the portion of the door 120 corresponding to the circumferential portion. The second sealing portion 137 may be made of rubber, synthetic resin, urethane, silicon or other materials having high airtightness.

If the door 120 consists of the first door 121 and the second door 123, the first sealing 117 and the second sealing 137 are installed to each door 120.

The frame integrated vacuum hot press 100 according to the embodiment of the present invention may include a vacuum unit (not illustrated).

The vacuum unit evacuates the vacuum space 111 in the state in which the frame chamber 110 is closed by the door 120, thereby adjusting the degree of vacuum in the vacuum space 111.

The vacuum unit includes a vacuum pump capable of evacuating air from the vacuum space 111 of the frame chamber 110.

Figure 8:
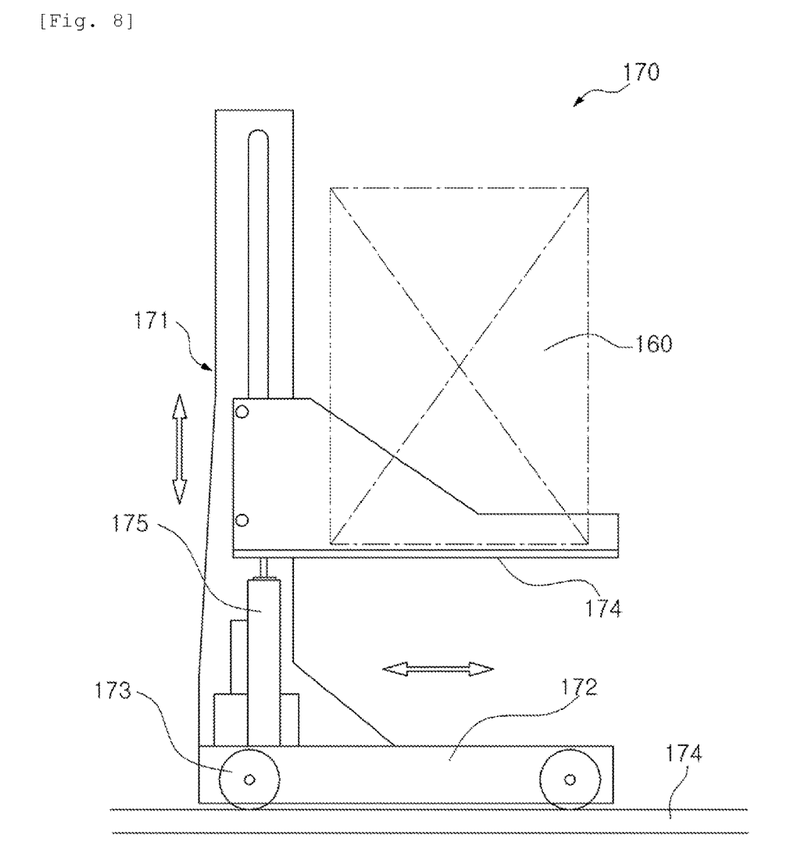
FIG. 8 is a side view schematically illustrating a transport mechanism of the frame integrated vacuum hot press according to the embodiment of the present invention

As illustrated in FIG. 8, the frame integrated vacuum hot press 100 according to the embodiment of the present invention may include a transport mechanism 170.

The transport mechanism 170 can carry the mold 160, in which the object to be formed is accommodated, in or out from the heating space 131 in the state in which the door 120 is opened from the frame chamber 110, or can directly carry the object to be formed in or not.

The transport mechanism 170 may have rails 177 and a cart 171.

The cart 171 moves along the rails 177, and the rails can be installed on the floor on which the frame integrated vacuum hot press 100 is installed.

The rails 177 may be extended from a positioned location of the frame chamber 110 to a desired position spaced apart from the frame chamber 110.

The cart 171 moves along the rails 177 from the desired position spaced apart from the frame chamber 110 to the heating chamber 130 of the frame chamber 110, while supporting the mold 160 or the object to be formed, thereby carrying the mold 160 or the object to be formed into the heating chamber 130.

The cart 171 may have a traveling unit 172 equipped with wheels 173 running along the rails 177, and a shelf 174 installed to the cart 171 to be movable in a vertical direction or a horizontal direction above the traveling unit 172.

The wheels 174 can be rotated by a motor, and the shelf 174 can be configured to be moved above the traveling unit 172 in a vertical direction or a horizontal direction by a movable cylinder 175.

With the configuration of the transport mechanism 170, the shelf 174 is moved downwardly toward the traveling unit 172 at the desired position spaced apart from the frame chamber 110, and then the mold 160 or the object to be formed is loaded on the shelf 174. After that, the transport mechanism is moved to the frame chamber 110 by the wheels 173 running along the rails 177, and the shelf 174 is moved upwardly to the position of the heating chamber 130 by the movable cylinder 175.

The shelf 174 is moved forward from the traveling unit 172 by the movable cylinder 175 to seat the mold 160 and the object to be formed on the inside of the heating chamber 130. After that, if the shelf 174 is moved rearward, the shelf 174 moves away from the heating chamber 130, and the mold 160 or the object to be formed stays in the heating chamber 130. The unloading of the mold or the object to be formed is carried out by the transport mechanism 170 operating contrary to the loading process.

The operation and effect of the respective components will be described.

In the frame integrated vacuum hot press 100 according to the embodiment of the present invention, the heating chamber 130 is positioned in the frame chamber 110, and the heater 133 is installed in the heating chamber to heat the object to be formed.

The heating chamber 130 is equipped with the height adjusting part 135 to adjust the height of the heating chamber 130 in the frame chamber 110.

The frame chamber 110 is provided with the door 120 to hermetically seal the opened portion of the vacuum space 111 of the frame chamber 110 and the opened portion of the heating space 131 of the heating chamber 130.

In the case where both sides of the frame chamber 110 are opened, the first door 121 and the second door 123 are installed to respectively hermetically seal both sides.

The frame chamber 110 is equipped with the cylinders 140 and 150 to apply the pressure to the object to be formed. The driving shaft 141 of the first cylinder 140 and the driving shaft 151 of the second cylinder 150 may be configured to apply the pressure to the workpiece in the opposite direction. Alternatively, the driving shaft 141 of the first cylinder 140 may be connected to the upper portion of the frame chamber 110, or the driving shaft 151 of the second cylinder 150 may be connected to the lower portion of the frame chamber 110, so that the object to be formed is pressed by one of the driving shafts 141 and 151.

In this instance, the driving shaft 141 of the first cylinder 140 and the driving shaft 151 of the second cylinder 150 are installed to penetrate through the heating chamber 130 so that the object to be formed loaded in the heating chamber 130 can be pressed. The object to be formed can be loaded in the heating chamber 130 in the state in which the object to be formed is accommodated in the mold 160.

With the above configuration of the frame integrated vacuum hot press 100 according to the embodiment of the present invention, the door 120 is opened from the frame chamber 110 so that the object to be formed can be loaded in the heating chamber 130.

The object to be formed is inserted into the mold 160 by the transport mechanism 170, and then the mold 160 is carried in the heating chamber 130. After that, the vacuum space 111 is sealed by closing the door 120 to create the vacuum therein, as well as sealing the heating chamber 130.

If the frame chamber 110 is sealed by the door 120, the inner pressure of the vacuum space 111, in which the compression molding is carried out, is adjusted by the vacuum unit, and the heater 133 is operated to heat the heating chamber 130.

An inert gas can be introduced into the vacuum space 111 or the heating space 121.

If the heating chamber 130 is heated thereby to heat the object to be formed, the mold 160 is pressed by operating the first cylinder 140 and the second cylinder 150, thereby compressing the object to be formed.

Therefore, the compression molding, such as sintering of the object to be formed or laminating of the layered objects to be formed, can be carried out by applying the pressure to the object to be formed through the first cylinder 140 and the second cylinder 150 simultaneously with applying the heat to the object to be formed through the heater 133.

If the compression molding is finished during a predetermined time, the air is gradually introduced into the vacuum space 111 to release the vacuum, and then the door 120 is opened. After that, if the mold 160 or the object to be formed is unloaded from the heating chamber 130 by the transport mechanism 170, the compression molding of the object to be formed is finished.

Accordingly, with the configuration of the frame integrated vacuum hot press 100 according to the embodiment of the present invention, since the frame chamber 110 serves as a support of the cylinders 140 and 150, as well as the vacuum chamber, it is not necessary to separately manufacture a frame supporting the cylinders 140 and 150, thereby simplifying the structure of the frame integrated vacuum hot press 100, and thus lowering a production cost.

Also, the vacuum chamber 111 of the frame chamber 110 serves as an insulator, it is possible to minimize a heat loss from the heating chamber 130 to the frame chamber 110.

In addition, since the compression molding is carried out under the vacuum atmosphere, the object to be formed can be heated at a higher temperature, thereby improving strength, corrosion resistance, fatigue life, abrasion resistance, impact resistance, lightness, light weight, electrical insulation, or the like, which are beyond a limit of the material of the object to be formed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The frame integrated vacuum hot press according to present invention can be applied to various industry fields, such as heating bonding or compression molding.

The invention claimed is:

1. A frame integrated vacuum hot press comprising:
   an integrated frame chamber comprising an upper frame in which a first cylinder is installed, a lower frame in which a second cylinder is installed, and both side frames, which are integrated by forming a rectangular shape, wherein a vacuum space is formed at a center of the frame chamber;
   a door installed to the frame chamber to open or close an opened side of the vacuum space; and
   a heating chamber including a heating space and a heater heating an object to be formed which is loaded in the heating space of the heating chamber,
   wherein the first and the second cylinders apply pressure to the object to be formed which is loaded in the heating space of the heating chamber.

2. The frame integrated vacuum hot press according to claim 1, further comprising a mold which is seated in the heating chamber and is pressed by the first and the second cylinders to compress the object to be formed, thereby enabling the object to be formed to have a desired shape.

3. The frame integrated vacuum hot press according to claim 1, wherein the heating chamber is configured so that a side facing the same direction as the opened side of the frame chamber is opened, and the heating space is opened or closed by the door when the vacuum space is opened or closed by the door.

4. The frame integrated vacuum hot press according to claim 1, further comprising a first sealing configured to hermetically seal a gap between a circumference of the vacuum space and the door; and
   a second sealing configured to hermetically seal a gap between a circumference of the heating space and the door.

5. The frame integrated vacuum hot press according to claim 1, wherein the first and the second cylinders apply pressure to both sides of the frame chamber in an opposite direction.

6. The frame integrated vacuum hot press according to claim 1, wherein the door includes a first door to open or close one side of the vacuum space, and a second door to open or close the other side of the vacuum space opposite to the one side.

7. The frame integrated vacuum hot press according to claim 1, wherein the heating chamber includes a height adjusting unit to adjust a height of the heating chamber in the frame chamber.

8. The frame integrated vacuum hot press according to claim 2, further comprising a transport mechanism configured to carry the mold in or out from the heating chamber.

9. The frame integrated vacuum hot press according to claim 8, wherein the transport mechanism includes a rail installed on a floor, and a cart running along the rail to carry the mold.

10. The frame integrated vacuum hot press according to claim 1, wherein the frame chamber includes a vacuum unit to evacuate the vacuum space to adjust a degree of vacuum in the vacuum space.

* * * * *